(12) United States Patent
Whitley

(10) Patent No.: US 11,706,643 B2
(45) Date of Patent: *Jul. 18, 2023

(54) ROUTE CONNECTIVITY OPTIMIZATION MAPPING

(71) Applicant: DISH Network L.L.C., Englewood, CO (US)

(72) Inventor: Samuel Whitley, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,220

(22) Filed: Aug. 3, 2022

(65) Prior Publication Data
US 2022/0377581 A1 Nov. 24, 2022

Related U.S. Application Data

(63) Continuation of application No. 16/594,175, filed on Oct. 7, 2019, now Pat. No. 11,445,384.

(51) Int. Cl.
*H04W 24/02* (2009.01)
*H04W 36/16* (2009.01)
*H04W 36/38* (2009.01)

(52) U.S. Cl.
CPC ......... *H04W 24/02* (2013.01); *H04W 36/165* (2013.01); *H04W 36/38* (2013.01)

(58) Field of Classification Search
CPC .... H04W 24/02; H04W 36/165; H04W 36/38

USPC .......................................................... 370/331
See application file for complete search history.

(56) References Cited

U.S. PATENT DOCUMENTS

| 2010/0318507 A1* | 12/2010 | Grant ................. | G06Q 30/0277 707/706 |
| 2012/0275375 A1* | 11/2012 | Liu ........................ | H04L 45/121 370/328 |
| 2020/0341490 A1* | 10/2020 | Silva ................... | B60W 60/001 |

\* cited by examiner

*Primary Examiner* — Chi Tang P Cheng
(74) *Attorney, Agent, or Firm* — Kilpatrick Townsend & Stockton LLP

(57) ABSTRACT

Novel techniques are described for generation, distribution, and management of route connectivity optimization (RCO) mapping. For example, as mobile devices traverse travel routes serviced by one or more mobile networks, they can experience periods of different levels of connectivity with the mobile network(s). Embodiments can collect route segment connectivity data as experienced by consumer devices during traversal through mobile networks (e.g., indicating, for each route segment, which carriers are providing service to a mobile device, the level of service being provided, etc.). A RCO can be computed and stored for the set of route segments as a function of the route segment connectivity data. The RCO can be requested by consumers, and a corresponding link can be generated. Selecting the link can provide the consumers with remote access to the RCO, with which the consumers can generate connectivity-optimized route guidance maps.

16 Claims, 5 Drawing Sheets

ROUTE CONNECTIVITY OPTIMIZATION MAPPING

CROSS REFERENCE TO RELATED APPLICATIONS

This application is a continuation of U.S. Non-Provisional patent application Ser. No. 16/594,175, filed on Oct. 7, 2019, which is incorporated by reference for all purposes.

FIELD

This invention relates generally to communication network connectivity, and, more particularly, to generation, distribution, and management of route connectivity optimization mapping.

BACKGROUND

Consumers are increasingly desiring to maintain network connectivity using mobile devices while in transit. For example, while sitting in a car, train, bus, airplane, or other transport vehicle, smartphone users may desire to conduct voice and/or video calls, consume streaming media, use route guidance and global positioning system (GPS) applications, communicate via email and/or text messaging, etc. To maintain such mobile connectivity, smartphones and other mobile devices (e.g., tablet computers, laptop computers, smart wearable devices, mobile Internet of Things (IoT) devices, etc.) typically negotiate handoffs with a communication network. For example, communication services can be provided by a cellular network to a cellular device via cellular towers geographically distributed throughout the cellular network. As the cellular device moves through the cellular network, moving in and out of range of different cellular towers, the cellular towers perform handoffs to each other to maintain connectivity with the cellular device. Similar handoffs occur with other types of mobile networks and mobile devices.

When such handoffs are performed within a single mobile network with good coverage over the travel paths of mobile devices, the handoffs tend to be relatively seamless and transparent to consumers of the mobile devices. However, coverage of a mobile network may be relatively poor, or even unavailable, in certain regions. In those regions, some mobile networks tend simply to drop connectivity, or provide appreciably degraded service (e.g., very low bit rate, spotty connectivity, etc.). Other mobile networks attempt to handoff connectivity to a different network with better coverage in the region. In such cases, consumers can experience dropped calls, loss of media streaming, and/or other undesirable results.

BRIEF SUMMARY

Among other things, embodiments provide novel systems and methods for generation, distribution, and management of route connectivity optimization (RCO) mapping. For example, as mobile devices traverse travel routes serviced by one or more mobile networks, they can experience periods of different levels of connectivity with the mobile network(s). Embodiments can collect route segment connectivity data as experienced by consumer devices during traversal through mobile networks (e.g., indicating, for each route segment, which carriers are providing service to a mobile device, the level of service being provided, etc.). A RCO can be computed and stored for the set of route segments as a function of the route segment connectivity data. The RCO can be requested by consumers, and a corresponding link can be generated. Selecting the link can provide the consumers with remote access to the RCO, with which the consumers can generate connectivity-optimized route guidance maps.

According to one set of embodiments, a system is provided for route connectivity optimization (RCO) mapping in a communication network servicing multiple consumer devices. The system includes a route segment connectivity data store and a route-connectivity processor, coupled with the route segment connectivity data store. The route-connectivity processor is to: receive individual route segment connectivity data as experienced by an initiating consumer device of the plurality of consumer devices during traversal through the communication network via a set of route segments between a location pair comprising an origin location and a destination location; compute a route-connectivity optimization for the set of route segments as a function of the individual route segment connectivity data; and store the route-connectivity optimization in the route segment connectivity data store in association with at least one of the set of route segments or the location pair. The system further includes a request processor, coupled with the route-connectivity processor, to receive an RCO request from a requesting consumer device of the plurality of consumer devices indicating at least one of the set of route segments or the location pair. The system further includes a link processor to generate an RCO link by retrieving the route connectivity optimization in response to the RCO request, such that the RCO link provides remote access, by the requesting consumer device, to the route-connectivity optimization, wherein the request processor is further to transmit the RCO link by the RCO server to the requesting consumer device responsive to the RCO request.

According to another set of embodiments, a method is provided for route connectivity optimization (RCO) mapping in a communication network. The method includes: receiving, by an RCO server, individual route segment connectivity data as experienced by an initiating consumer device during traversal through the communication network via a set of route segments between a location pair comprising an origin location and a destination location; computing, by the RCO server, a route-connectivity optimization for the set of route segments as a function of the individual route segment connectivity data; storing the route-connectivity optimization by the RCO server in association with at least one of the set of route segments or the location pair; receiving an RCO request by the RCO server, the RCO request indicating at least one of the set of route segments or the location pair; generating an RCO link, by the RCO server, by retrieving the route connectivity optimization in response to the RCO request, the RCO link providing remote access, by a requesting consumer device, to the route-connectivity optimization; and transmitting the RCO link by the RCO server to the requesting consumer device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
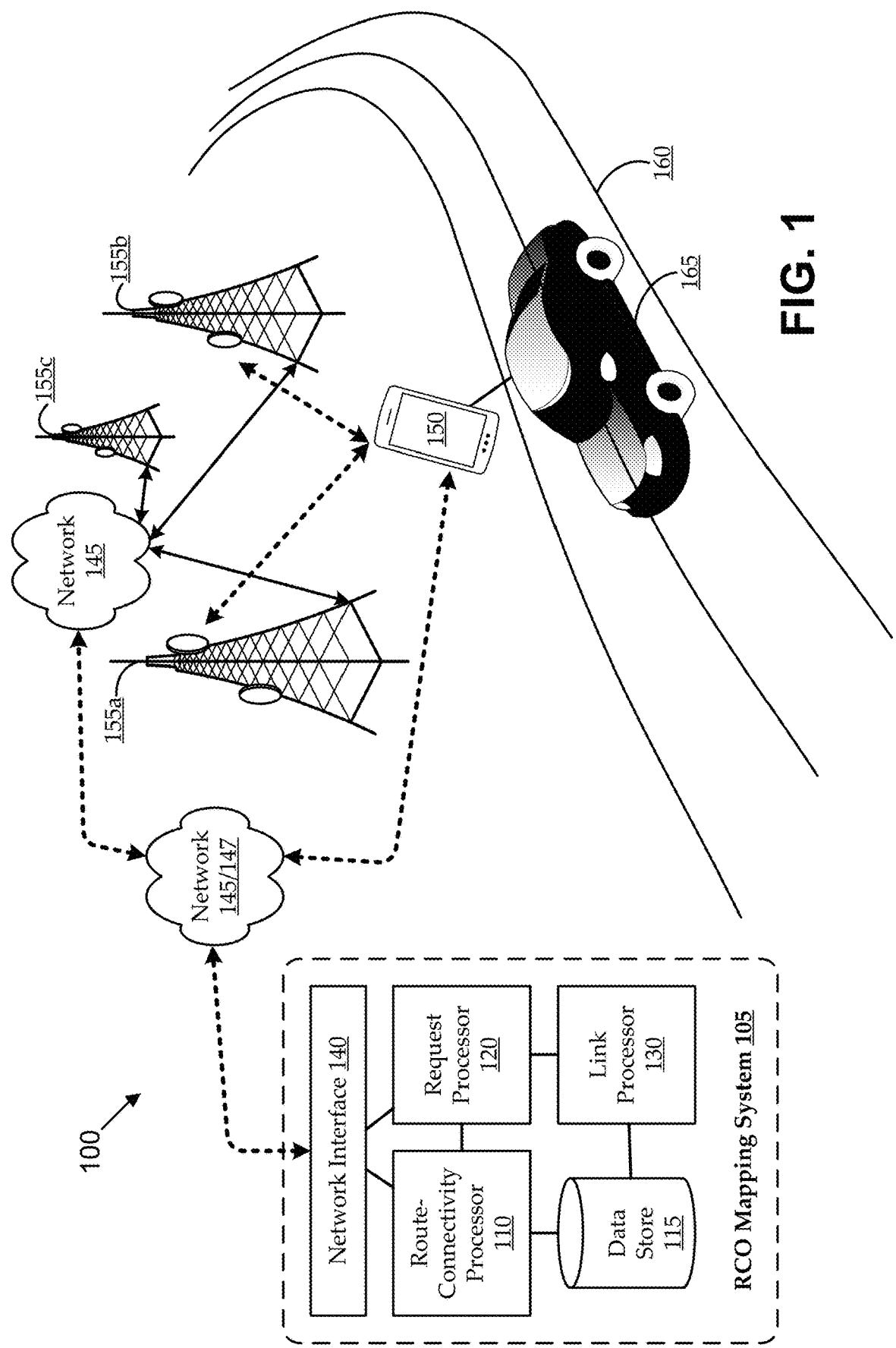
FIG. 1 shows a network environment as a context for various embodiments.

Turning to FIG. 1, a network environment 100 is shown as a context for various embodiments. The network environment 100 includes a transport craft 165 traversing a transport route 160 and having, disposed therein, a consumer using a mobile device 150 to communicate with one or more mobile networks 145. While the mobile network(s) 145 are illustrated as a cellular network having multiple cellular towers 155 to provide connectivity to the mobile device 150, the mobile network(s) 145 can alternatively or additionally include satellite networks, narrow-band Internet of Things (nb-IoT) networks, Worldwide Interoperability for Microwave Access (WiMAX) networks, and/or any other suitable wireless networks. Such mobile network(s) 145 can include any suitable types of carriers (e.g., cellular towers 155, satellite spot beams, etc.) and can be comprised of any suitable wired and/or wireless, public and/or private network links. While the mobile device 150 is illustrated as a cellular smartphone, the mobile device 150 can alternatively or additionally include a smartphone, laptop computer, tablet computer, smart wearable device, Internet of Things (IoT) device, and/or any other suitable mobile device 150. In some embodiments, the mobile devices 150 are personal portable devices (separate or separable from the transport craft 165). In other embodiments, the mobile devices 150 can include devices integrated with the transport craft 165. For example, the mobile device can include an in-vehicle computational system with an in-dash and/or seatback-mounted display, such as an integrated navigation system, or the like. While the transport craft 165 is illustrated as a car, the transport craft 165 can alternatively or additionally include any public or private automobile, aircraft, bus, train, boat, tram, utility vehicle, maintenance vehicle, construction vehicle, public transit vehicle, emergency service vehicle, and/or any other suitable transport craft 165. The transport route 160 can include any suitable transport route 160 traversable by the transport craft 165 (e.g., a road, dirt path, driveway, etc. for an automobile; a track for a train; an air route for an aircraft; etc.).

It can be assumed that the mobile device 150 is being used by a passenger of the transport craft 165, in transit, to communicate with the mobile network(s) 145. For example, the passenger is engaged in a voice and/or video call, is consuming streaming media, is using route guidance and/or global positioning system (GPS) applications, etc. for which it is desirable to maintain connectivity with the mobile network(s) 145. Connectivity services are typically handled by various nodes and infrastructure of the mobile network(s) 145, at times further involving participation by the mobile device 150. For example, at any particular time, the mobile device 150 is in cellular communication with one or more of the cellular towers 155 of the mobile network(s) 145 selected to service the mobile device 150 at that time. Typically, the mobile network(s) 145 (e.g., the cellular towers 155) continually seek to determine which of the cellular towers 155 can provide the best connectivity to the mobile device 150 based, for example, on the location of the mobile device 150, measured signal strength, load balancing considerations (e.g., available capacity of the cellular towers 155), and/or other factors. The factors tend to change dynamically as the mobile device 150 moves through the mobile network(s) 145. For example, the location of the mobile device 150 relative to each cellular tower 155 can impact the quality of the communication services (e.g., the signal strength) provided to the mobile device 150 by that cellular tower 155.

Thus, as the transport craft 165 (and therefore the mobile device 150) traverses the transport route 160 through the mobile network(s) 145, the cellular towers 155 can perform handoffs to each other in an attempt to keep servicing the mobile device 150 with the optimal cellular tower 155. Similar handoffs occur with other types of mobile networks 145 and mobile devices 150. For example, a satellite network can perform such handoffs when servicing connectivity to an aircraft flying through multiple carriers of the satellite network. By way of example, as transport craft 165 drives along the transport route 160 illustrated in FIG. 1, the transport craft 165 can move into and out of range of the different illustrated cellular towers 155; being closer first to cellular tower 155c, then to cellular tower 155b, and then to cellular tower 155a.

When such handoffs are performed within a single mobile network 145 with good coverage over the travel paths of mobile devices 150, and the handoffs are between carriers with similar frequency bands and/or other characteristics, the handoffs can tend to be relatively seamless and transparent to passengers using the mobile devices 150. However, coverage of a mobile network 145 may be relatively poor, or even unavailable, in certain regions. In those regions, some mobile networks 145 tend simply to drop connectivity, or provide appreciably degraded service (e.g., very low bit rate, spotty connectivity, etc.). Other mobile networks 145 attempt to handoff connectivity to a different mobile network 145 with better coverage in the region; and/or they can attempt to handoff connectivity to other carriers of the same network (e.g., other cellular towers 155, or the like) having different frequency bands, coverage areas, and/or other characteristics. In these and/or other cases, consumers can experience dropped calls, loss of media streaming, and/or other undesirable results. Further, in some cases, loss of coverage can cause dangerous conditions, such as loss of driver attention, loss of access to mobile emergency services, loss of access to mobile sensor data, etc.

As illustrated, embodiments described herein include a route connectivity optimization (RCO) mapping system 105. The RCO mapping system 105 can facilitate generation, distribution, and/or management of route connectivity optimization and mapping thereof. For example, as mobile devices 150 traverse transport routes 160 serviced by the mobile network(s) 145, embodiments can collect route segment connectivity data as experienced by the mobile devices 150 (e.g., indicating, for each route segment, which carriers are providing service to a mobile device, the level of service being provided, etc.). The collected data can be used individually, and/or in aggregate, to compute and store route-connectivity optimizations (RCOs) for particular routes, route segments, and/or the like. The RCOs can be requested by consumers, and corresponding links can be generated to provide consumers with access to the RCOs. As described herein, the RCOs (e.g., via the RCO links) can provide various features for consumers, such as connectivity-optimized route guidance maps.

As an example, a first business associate is planning a business trip to headquarters and will be driving from the airport. A second business associate, having previously traveled the route, participated in collection of route segment connectivity data along the way, which was used by embodiments described herein to compute an RCO for the route between the airport and headquarters. The second business associate can request a RCO link for that route and can send the RCO link to the first business associate. In response to the first business associate clicking the link, embodiments can provide the first business associate with a connectivity-optimized travel route as a function of the RCO. For example, the connectivity-optimized travel route can indicate a transport route 160 computed to provide optimal connectivity to the first business associate (e.g., with route segments selected to minimize the chance of a dropped connection, even if the route is slightly longer), and/or the connectivity-optimized travel route can indicate an optimized transport route 160 (e.g., a fastest route) and can use the RCO to manage implementation of a best connectivity solution for the optimized transport route 160.

Embodiments of the RCO mapping system 105 include a route-connectivity processor 110, a data store 115, a request processor 120, a link processor 130, and a network interface 140. Embodiments of the route-connectivity processor 110 can receive individual route segment connectivity data as experienced by an initiating mobile device 150 as it traverses through the mobile network(s) 145 via a set of route segments (of a transport route 160) between a location pair. In some implementations, the route segment connectivity data indicates, for each route segment of some or all of a transport route 160, a carrier (e.g., cellular tower 155) of the communication network that serviced the initiating mobile device 150 during traversal via the route segment, and a quality of service provided to the mobile device 150 by the carrier. In some implementations, the location pair is defined as an origin location and a destination location. For example, each location can be defined as map coordinates, street addresses, global positioning satellite (GPS) coordinates, as logically predefined locations (e.g., "Visitor Parking, Headquarters Building 1"), or in any other suitable manner. In other implementations, the location pair is defined to include preferred route segments, most commonly traversed route segments, and/or other desired information. In some embodiments, some or all of the route segment connectivity data is received as experienced by the mobile device 150. For example, upon completion or each handoff, upon determining to perform a handoff, or at any other suitable time during transit, information can be collected (e.g., from the mobile device 150, from one or more carriers of the mobile network(s) 145, etc.) as route segment connectivity data. In other embodiments, some or all of the route segment connectivity data is received subsequent to being experienced by the mobile device 150. For example, upon arrival at a destination location, or at any other time subsequent (e.g., upon an explicit request by a user), route segment connectivity data can be collected.

Embodiments of the route-connectivity processor 110 can also compute a route-connectivity optimization (RCO) for the set of route segments as a function of the individual route segment connectivity data. Computing the route-connectivity optimization can be performed at different time and in different ways. In some embodiments, the route-connectivity optimization is computed for the particular transport route 160 in its entirety. For example, an optimized connectivity is determined across the traversed sequence of route segments between the origin and destination locations. In other embodiments, the route-connectivity optimization is computed for each route segment (or other identified location, such as particular map waypoints) across some or all of the transport route 160. For example, the route-connectivity optimization is computed to indicate, for each route segment, an optimal carrier to use for handoffs. In some implementations, the individual route segment connectivity data from a particular traversal is used to compute the route-connectivity optimization. In other implementations, the individual route segment connectivity data is aggregated with other route segment connectivity data, for example, collected from the same mobile device 150, from other mobile devices 150, etc. For example, each time a mobile device 150 traverses a particular route segment, route segment connectivity data can be collected. The route segment connectivity data can indicate which carrier was used for a handoff, whether the handoff was successful, signal strength prior and subsequent to the handoff, whether there was a connectivity-indicative event (e.g., a dropped call, stalled media streaming, etc.), etc. The route segment connectivity data can be aggregated across all samples, or segregated using additional information. For example, the route segment connectivity data can be collected (e.g., or categorized, segregated, filtered, normalized, etc.) with reference to a direction of travel over the route segment, the type of mobile device 150 being used for connectivity, the time of traversal of the route segment (e.g., time of day, day of week, etc.), the type of connectivity service being used (e.g., phone call, streaming media, etc.), type of network connection (e.g., 3G, 4G/LTE, 5G, etc.) etc. Some implementations only record successful connections, other implementations only record unsuccessful connections, and other implementations record both successful and unsuccessful connections.

The route-connectivity processor 110 can also store the route-connectivity optimization in the route segment connectivity data store 115. In some implementations, the route-connectivity optimization is stored at the data store 115 in association with the location pair. In other implementations, the route-connectivity optimization is stored at the data store 115 in association with the set of route segments. For example, route-connectivity optimization information can be stored per route segment, per logical grouping of route segments (e.g., map region), per route segment sequence, etc. In some implementations, the data store 115 is a route segment connectivity data store only for storing route segment connectivity data. In other implementations, the data store 115 is used to store additional types of information.

Embodiments of the request processor 120 can be coupled with the route-connectivity processor 110 to receive RCO requests from requesting ones of the mobile devices 150. The RCO requests can include any information that is usable to retrieve a route-connectivity optimization for a desired route. For example, the RCO requests can indicate a set of route segments, a location pair, etc. In some implementations, an RCO request is issued by a mobile device 150 upon (or otherwise in association with) completing traversal of a particular transport route 160. For example, after traversing a transport route 160, the mobile device 150 can automatically issue a RCO request, the user of the mobile device 150 can explicitly issue a RCO request, or the RCO request can be issued as part of uploading route segment connectivity data. In other implementations, the RCO request is issued by (or via) a mobile device 150 prior to traversing a transport route 160. For example, the RCO request is issued by a user of a mobile device 150 that previously traversed the same (or a similar) transport route 160, by a user of a mobile device 150 that never traversed that transport route 160, etc.

Embodiments of the link processor 130 can generate RCO links by retrieving the route connectivity optimizations in response to the RCO requests. The RCO links are generated so as to provide remote access, by the requesting mobile devices 150, to the route-connectivity optimizations. An RCO link can be transmitted by the request processor 120 to the requesting mobile device 150 in response to, and in accordance with, a corresponding RCO request. In some implementations, the RCO link is generated by the link processor 130 prior to any RCO request. In other implementations, the RCO link is generated by the link processor 130 in response to an RCO request. The RCO links can include a uniform resource locator (URL), a quick response (QR) code, a virtual button, and/or any other suitable link by which a user can remotely access a particular route-connectivity optimization. Further, the RCO link can be provided in any suitable manner. For example, the RCO link can be provided via a short message service (SMS) message, a multimedia messaging service (MMS) message, a user interaction control (e.g., a graphical element) of a portal application, an email message, a voice message prompt, etc.

In some implementations, the RCO link is requested by, and provided to, a first mobile device 150; and the first mobile device 150 then sends the received RCO link to a second mobile device 150. For example, a business associate requests and receives the RCO link for a particular transport route 160, and sends the received RCO link (e.g., via SMS or email) to a customer that is coming to the business associate's office. In other implementations, the RCO link is requested by a first mobile device 150, and the request indicates that the RCO link should be sent to a second mobile device 150 (i.e., sent in a manner accessible via a second mobile device 150). For example, in response to the RCO request by the first mobile device 150, an email is sent to an email address (e.g., or an SMS message is sent to a mobile phone number) of a user associated with a second mobile device 150. For example, a business associate requests the RCO link, and, in response to the request, a customer of the business associate receives the RCO link by SMS or email. In other implementations, the RCO link is requested by, and provided to, an end-user mobile device 150. For example, a business associate requests and receives the RCO link for her own use in traversing a particular transport route 160.

In some embodiments, subsequent to issuing the RCO link, the request processor 120 can receive a link request from a mobile device 150. The link request can be responsive to an interaction via the requesting mobile device 150 with the RCO link. For example, the link request results from a user clicking on a link, scanning a QR code, interacting with a graphical user interface control, etc. In some implementations, the link request originates from the same mobile device 150 that issued the RCO request. For example, a single user can request the RCO link (by a RCO request), receive the RCO link, and interact with the RCO link to issue the link request. In other implementations, the link request originates from the a different mobile device 150 than the one that issued the RCO request. For example, a first user can request the RCO link (by a RCO request), and a second user can interact with the RCO link to issue the link request.

Responsive to such a link request, the link processor 130 can generate a link response indicating a sequence of route segments for the requesting consumer device to traverse from the origin location to the destination location with optimized network connectivity in accordance with the route-connectivity optimization. In some implementations, interacting with the RCO link causes components of the RCO mapping system 105 to retrieve a previously generated route-connectivity optimization associated with the route segments indicated by the RCO link. In other implementations, interacting with the RCO link causes components of the RCO mapping system 105 to generate a route-connectivity optimization associated with the route segments indicated by the RCO link. In other implementations, interacting with the RCO link causes components of the RCO mapping system 105 to determine whether generation of a route-connectivity optimization is warranted in association with the route segments indicated by the RCO link. For example, the route-connectivity processor 110 route-connectivity processor 110 can determine whether the requested route-connectivity optimization (or any of the information that is part of the route-connectivity optimization) is stale, is associated with route segments having new route connectivity data, etc. In instances where the requested RCO link is determined to need updating (e.g., the RCO link is stale), embodiments can respond in various ways. For example, the request processor 120 can respond to the requesting mobile device 150 with a message or other indication of such a determination (e.g., with a prompt asking to request generation of a new route-connectivity optimization). As another example, in such an instance, the route-connectivity processor 110 can automatically compute an updated route-connectivity optimization for use in response to the link request (e.g., with a new RCO link). In some implementations, the RCO link is a specific link associated with a specific route-connectivity optimization (e.g., valid for a specific amount of time). In other implementations, the RCO link is generally associated with a particular transport route 160 (e.g., set of route segments, location pair, etc.), and interaction with the RCO link returns a link response with whatever is the freshest information relating to the associated transport route 160.

In some embodiments, in response to the link request, the request processor 120 can transmit the link response to the requesting mobile device 150. The link response can be transmitted in any suitable manner and in any suitable format. In some implementations, the link response includes a set of route guidance instructions. For example, the route guidance instructions can include transit directions, a route segment sequence and/or other route segment information, a map, etc. In other implementations, the link response includes a instructions (e.g., human-readable instructions, computer-readable instructions, instructions formatted in accordance with an application programming interface (API), etc.) to direct operation of a route guidance system and/or application (e.g., a route guidance application on a mobile device 150, a route guidance application on a device integrated into a transport craft 165 (e.g., an in-dash navigation system for an automobile), a GPS device, etc.

In some embodiments, in response to the link request, the request processor 120 (or any other suitable component(s) of the RCO mapping system 105) can determine a sequence of carrier settings in the mobile network(s) 145 to optimize connectivity to the requesting mobile device 150 during traversal from the origin location to the destination location in accordance with the route-connectivity optimization. The carrier settings can include instructions to direct handoffs of the mobile device 150 to particular cellular towers 155 and/or other infrastructure of the mobile network(s) 145. For example, the route-connectivity processor 110 and/or other component(s) of the RCO mapping system 105 can generate a set of instructions to direct connectivity of the requesting mobile device 150 with the mobile network(s) 145 during the traversal from the origin location to the destination location in accordance with the sequence of carrier settings. In some implementations, some or all of the instructions are transmitted to the mobile device 150, and the mobile device 150 can use the instructions to manage handoffs and/or other connectivity-related functions. In other implementations, some or all of the instructions are transmitted to infrastructure of the mobile network(s) 145 and are used by the mobile network(s) 145 manage handoffs and/or other connectivity-related functions with respect to the mobile device 150.

Embodiments of the network interface 140 include a provider network interface to communicate with the mobile network(s) 145. In some embodiments, the network interface 140 includes cellular, satellite, or other components by which to communicate with carriers (e.g., cellular towers 155) of the mobile network(s) 145. In other embodiments, the mobile network(s) 145 are in communication with one or more secondary networks 147. For example, the provider network(s) 147 can include the Internet, a backbone network, etc., and may include any suitable corresponding infrastructure (e.g., gateways and/or other service provider nodes). In certain implementations, the mobile network(s) 145 are part of the provider network(s) 147. In some embodiments, some or all of the individual route segment connectivity data can be received via the network interface 140 directly from one or more mobile devices 150 or other end-user devices (e.g., a computer coupled with the Internet). In other embodiments, some or all of the individual route segment connectivity data can be received by the network interface 140 via one or more service provider nodes of the mobile network(s) 145 and/or the provider network(s) 147. Any other communication with the RCO mapping system 105 can also be handled through the network interface 140. For example, RCO requests and link requests and be received by the network interface 140, RCO links and link responses can be transmitted by the network interface 140, etc. To that end, the network interface 140 can include any suitable component to facilitate such communications, including physical and/or logical ports, communication processors and chip sets, protocols, amplifiers, filters, etc.

Figure 2:
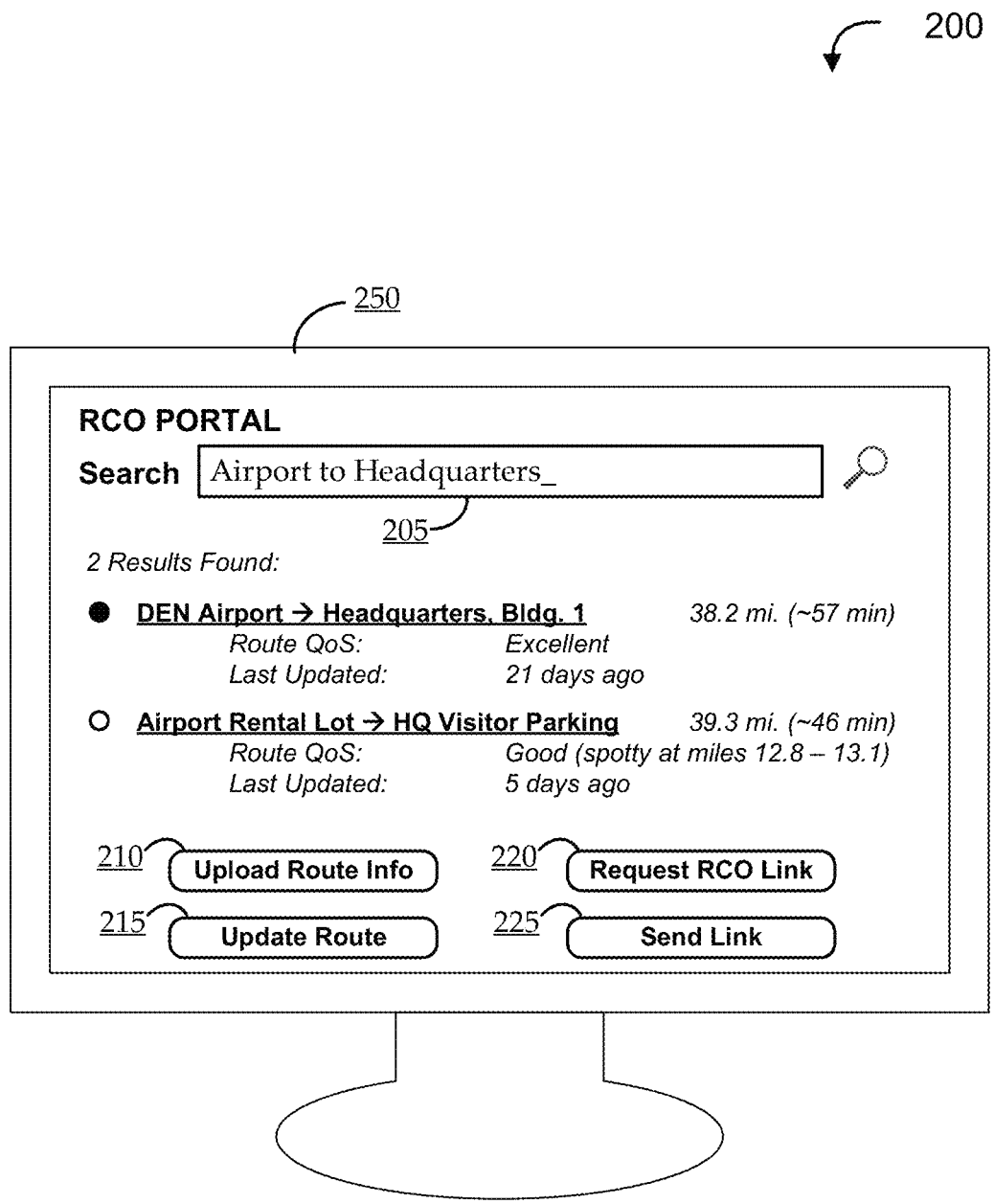
FIG. 2 shows an example of a graphical portal by which to provide various functions of an illustrative route connectivity optimization (RCO) mapping system, according to various embodiments.

FIG. 2 shows an example of a graphical portal 200 by which to provide various functions of an illustrative RCO mapping system 105, according to various embodiments. For the sake of clarity, the description uses the reference numerals described with reference to FIG. 1. The illustrative graphical portal 200 is shown displayed on a user device 250. In some embodiments, the user device 250 is a mobile device 150 of an initiating user, such as an individual who traverses a transport route 160 and for whom route segment connectivity data is collected and used ultimately to compute a route connectivity optimization. In other embodiments, the user device 250 is a mobile device 150 of a requesting user, such as an individual who requests a route connectivity optimization for a particular transport route 160. In other embodiments, the user device 250 includes an intermediary device of an initiating or requesting user, such as a laptop or desktop computer. In such embodiments, descriptions and claims herein that refer to a "user device," a "consumer device," a "mobile device," or the like, can (where appropriate) include a mobile device 150 and one or more intermediate devices (e.g., mobile or otherwise). As one example, during traversal of a transport route 160, an initiating user's mobile device 150 collects route segment connectivity data; subsequently, the initiating user pairs her mobile device 150 with her laptop computer and uploads the route segment connectivity data from her mobile device 150 to a RCO mapping system 105, or the like, via her laptop computer. As another example, a user receives an RCO link by email on her laptop computer and interacts with the link on her laptop computer, thereby receiving a link response; and forwards the link response to her mobile device 150 prior to traversing the transport route 160. As another example, a user exchanges route segment connectivity data, an RCO link, or other information between her mobile device 150 and a device integrated with the transport craft 165.

The graphical portal 200 can include a number of graphical elements, including displayed information and user interaction controls. In practice, the graphical portal 200 may include many more and/or different graphical elements, and the displayed embodiment is intended only to illustrate particular functionality described herein. As illustrated, the graphical portal 200 includes a search bar 205 and virtual buttons 210, 215, 220, 225. FIG. 2 shows an illustrative scenario in which a user is searching for connectivity-optimized route guidance for a particular transport route 160. The user has entered "Airport to Headquarters" in the search bar 205. In response to the search query, the portal 200 has returned two relevant search results, titled "DEN Airport to Headquarters, Bldg. 1" and "Airport Rental Lot to HQ Visitor Parking." Notably, the search query may use natural language processing and/or any other suitable technologies to identify and return relevant search results. In the illustrated instance, the search results are not identical to the search request terms, but are deemed relevant by a search algorithm.

The returned results can include any suitable information. For example, the first displayed result shows that the transport route 160 from the Denver airport to the main headquarters building is approximately 38.2 miles with an approximate travel time of 57 minutes; the second is slightly further (39.3 miles), but also faster (approximately 46 minutes). The returned travel time can be computed from the stored route segment connectivity data and/or processed concurrently with the request query. For example, at the time of returning the search results, embodiments can consult current traffic data to determine a present travel time. Some implementations can include additional features, such as permitting the user to select a preferred departure or arrival time (e.g., and computing predicted travel times for the selected departure or arrival time). The returned results can also indicate a level of freshness or staleness of the route connectivity optimizations associated with the returned transport route 160 options. For example, the first result is shown as last updated three weeks ago, while the second result was last updated only five days ago. The returned results can also indicate a predicted or estimated quality of service (QoS) for the route (e.g., which may include information relating to expected throughput, type of network, latency, etc.) in accordance with the route segment connectivity data and route connectivity optimization for each transport route 160. For example, the first result is shown as yielding excellent connectivity throughout, while the second result shows good connectivity and specifically identifies a known region of poor connectivity between miles 12.8 and 13.1. This information suggests that, while the displayed results both originate and end at approximately the same locations (i.e., generally from the airport to the headquarters) and are of similar total distance (38.2 miles and 39.3 miles), they have some appreciable differences. For example, a user opting to traverse the transport route 160 associated with the first result is predicted to experience better overall connectivity throughout the route, but with a longer predicted travel time; while a user opting to traverse the transport route 160 associated with the second result is predicted to experience spotty connectivity at least in some areas, but with a shorter predicted travel time. This can suggest that the different route options include different route segments and/or that there were appreciable changes in connectivity between five days ago and three weeks ago. In general, multiple similar results can be displayed (e.g., for the same, or substantially the same, location pair), and the user can select which is preferred. For example, each result can have a different respective travel distance and/or travel time, different respective freshness, different respective route QoS, etc. Some embodiments provide additional information. Some implementations prompt the user to enter a desired arrival time and automatically determines a suggested departure time, accordingly. Other implementations permits users to filter, sort, flag, or otherwise process search results with respect to user preferences, such as preferring or avoiding tollways, preferring or avoiding highways, preferring to pass local landmarks, preferring to pass a gas station, etc.

In other embodiments, the result of a search can be an optimized route. For example, the RCO mapping system 105 does not store route connectivity optimizations for particular transport routes 160. Rather, the RCO mapping system 105 can store route segment connectivity data and can compute the route connectivity optimization in response to the query using appropriate route segment connectivity data and/or other information (e.g., mapping data, present traffic conditions, user route preferences, etc.). In some such embodiments, only a single result is returned. In other such embodiments, multiple results can be returned, each representing a different set of preferences, a different interpretation of the search query, etc. For example, in such embodiments, the first illustrated result can represent a route connectivity optimization computed in response to the search query with a preference toward optimizing connectivity; while the second illustrated result can represent a route connectivity optimization computed in response to the search query with a preference toward optimizing travel time.

Various virtual buttons are illustrated. A first illustrative virtual button 210 permits a user to upload route information. For example, in some embodiments, route segment connectivity data collected at a user's mobile device 150 is automatically uploaded to the RCO mapping system 105 as it is collected, upon completion of traversal (e.g., upon reaching a destination location, upon entering a particular network (e.g., a local area network of an office), etc. In other embodiments, some or all route segment connectivity data is uploaded manually (e.g., on demand) by a user. The first illustrative virtual button 210 can be used in such embodiments. In some implementations, such a virtual button 210 can open one or more additional portals and/or provide one or more additional user interaction controls to permit a user to upload additional information relating to the transport route 160.

Virtual button 215 can facilitate updating a particular transport route 160. In some implementations, clicking such a virtual button 215 can cause the system to look for updated route segment connectivity data from the user and/or other users relating to potential route segments. For example, in response to the search query, the system can consult mapping systems and algorithms to develop potential sequences of route segments for the queried transport route 160. The system can then determine whether there is any updated route segment connectivity data for any of the potential route segments. If so, the system can compute one or more updated route connectivity optimizations for one or more potential solutions to the queried transport route 160. In some such implementations, users can periodically upload route segment connectivity data to a local network and/or to the RCO mapping system 105, and the uploaded data may be stored in association with particular route segments, and not automatically with a particular transport route 160 (e.g., route segment sequence or location pair). Any further association of the route segment connectivity data with a particular transport route 160 is a result of a subsequent computation of a route connectivity optimization.

Virtual button 220 can facilitate receipt of an RCO link. For example, using the button 220, a user issues a RCO request and receives an RCO response with an RCO link, accordingly. As described herein, the RCO link can be received in any suitable manner. For example, after clicking button 220, the user device 250 can receive a file, browser download, browser redirect, email, instant message, calendar invite message, or other communication that includes an Internet link (e.g., URL), QR code, access credentials for another portal, etc. In some embodiments, clicking on the button 220 causes the system to return a RCO link uniquely associated with a stored route connectivity optimization corresponding to a selected search result (or to an only search result). In other embodiments, clicking on the button 220 causes the system automatically to compute an updated route connectivity optimization and to generate an associated RCO link. In other embodiments, clicking on the button 220 causes the system to generate an RCO link uniquely associated with the route connectivity optimization and with additional information, such as information relating to the requesting user, user credentials, link credentials, link freshness (or staleness), etc. For example, the generated RCO link may be associated with an authorization code (e.g., the authorization code must be entered to use the RCO link), and/or the RCO link may be valid only for a certain time period (e.g., 30 days).

Virtual button 225 can facilitate sending a RCO link to another user. For example, a user can click on virtual button 220 to retrieve an RCO link. Subsequently, the user can either use the received RCO link for himself, or forward the link to someone else. Alternatively, the user can click on virtual button 225 to retrieve an RCO link for someone else. In response to clicking on the button 225, implementations can query the user for recipient information, such as for an email address, SMS number, etc. The RCO link can be sent to the other user in any suitable manner, such as including a file, browser download, browser redirect, email, instant message, calendar invite message, or other communication that includes an Internet link (e.g., URL), QR code, access credentials for another portal, etc.; and the RCO link can include any suitable additional information, such as identifying information, credentials, etc.

Figure 3:
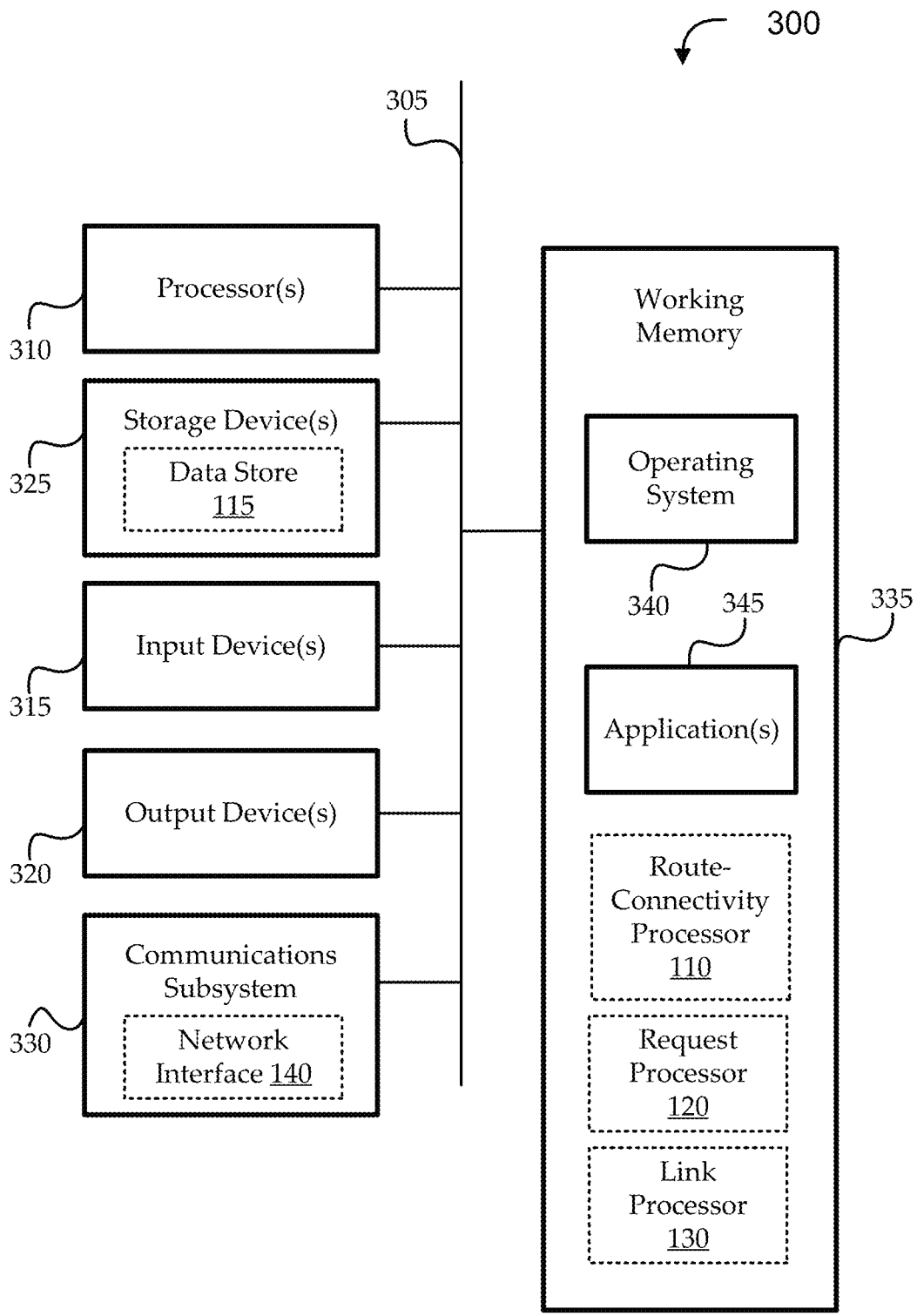
FIG. 3 provides a schematic illustration of one embodiment of a computer system that can implement various system components and/or perform various steps of methods provided by various embodiments.

Embodiments of the RCO mapping system 105, or components thereof, can be implemented on, and/or can incorporate, one or more computer systems, as illustrated in FIG. 3. FIG. 3 provides a schematic illustration of one embodiment of a computer system 300 that can implement various system components and/or perform various steps of methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, and/or the like; and one or more output devices 320, which can include, without limitation, a display device, a printer, and/or the like. In some implementations, the computer system 300 is a server computer configured to interface with additional computers (not with human users), such that the input devices 315 and/or output devices 320 include various physical and/or logical interfaces (e.g., ports, etc.) to facilitate computer-to-computer interaction and control.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 325 include the data store 115.

The computer system 300 can also include a communications subsystem 330, which can include, without limitation, a modem, a network card (wireless or wired), an infrared communication device, a wireless communication device, and/or a chipset (such as a Bluetooth™ device, an 302.11 device, a WiFi device, a WiMax device, cellular communication device, etc.), and/or the like. The communications subsystem 330 may permit data to be exchanged with a network (such as the mobile network(s) 145 described herein), other computer systems, and/or any other devices described herein. In some embodiments, the communications subsystem 330 includes the network interface 140.

In many embodiments, the computer system 300 will further include a working memory 335, which can include a RAM or ROM device, as described herein. The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the working memory 335 is used in conjunction with the one or more processors 310 to implement the route-connectivity processor 110, the request processor 120, and/or the link processor 130.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
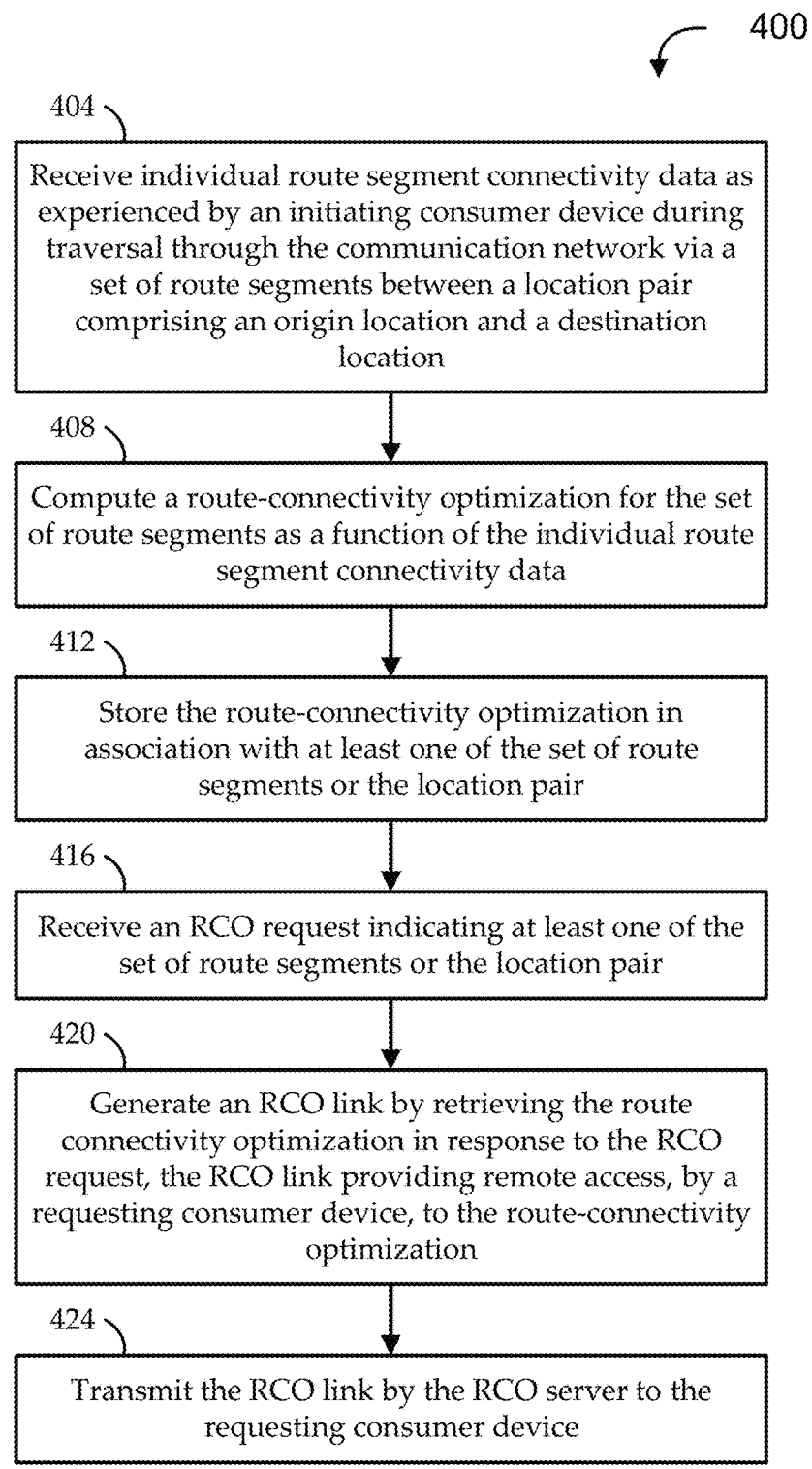
FIG. 4 shows a flow diagram of an illustrative method for route connectivity optimization (RCO) mapping in a communication network, according to various embodiments.

Systems including those described above can be used to implement various methods. FIG. 4 shows a flow diagram of an illustrative method 400 for route connectivity optimization (RCO) mapping in a communication network, according to various embodiments. Embodiments of the method 400 begin at stage 404 by receiving (e.g., by an RCO server) individual route segment connectivity data as experienced by an initiating consumer device during traversal through the communication network via a set of route segments between a location pair comprising an origin location and a destination location. In some implementations, some or all of the route segment connectivity data is received from the initiating consumer device (e.g., and/or other consumer devices). In other implementations, some or all of the route segment connectivity data is received from infrastructure of the mobile network(s). For example, mobile devices and/or cellular towers (or other infrastructure) can report successful handoffs, unsuccessful handoffs, which carrier is being used for connectivity in a particular route segment (e.g., and/or at a particular time, with a particular type of mobile device, etc.), measured signal strength, connectivity events (e.g., dropped calls, stalled streaming, etc.), throughput, type of network (e.g., 4G/LTE, 5G, etc.), latency, and/or any other suitable information.

At stage 408, embodiments compute (e.g., by the RCO server) a route-connectivity optimization for the set of route segments as a function of the individual route segment connectivity data. In some embodiments, the set of route segments is a subset of route segments of a mapping region serviced by one or more networks making up the communication network. For example, the route segments can be within a geographic region covered by multiple cellular carriers, satellite spot beams, etc. In such embodiments, computing the route-connectivity optimization at stage 408 can include aggregating the individual route segment connectivity data with previously stored route segment connectivity data for at least a portion of the route segments. For example, each individual record of route segment connectivity data for a particular route segment can be maintained for use in computing route connectivity optimizations, and/or data from multiple traversals of a same route segment and/or of multiple route segments by one or more users can be aggregated as route segment connectivity data for route segments. In some implementations, computations can treat different individual route segment connectivity data in different ways. In certain such implementations, preference (e.g., a higher weighting factor, or the like) can be given to route segment connectivity data from a particular user, a particular type of mobile device 150, data from particular times of day, etc. For example, if the computation is being made on behalf of a requesting user planning to traverse a transport route 160 at a particular time using a particular type of mobile device 150, the computation at stage 408 may more heavily weight route segment connectivity data collected in relation to times of day and/or mobile device 150 types most similar to that of the requesting user.

At stage 412, embodiments store the route-connectivity optimization (e.g., by the RCO server) in association with at least one of the set of route segments or the location pair. In some embodiments, the computing at stage 408 and/or the storing at stage 412 is responsive to the receiving the individual route segment connectivity data. For example, upon completion of traversing a transport route 160, embodiments can automatically upload any relevant route segment connectivity data and can automatically compute (e.g., and update) and/or store one or more route connectivity optimizations. In other embodiments, the computing at stage 408 and/or the storing at stage 412 is responsive to receiving the RCO link request at stage 404. For example, some or all route connectivity optimizations are computed and/or stored on demand in response to an explicit request by a user.

At stage 416, embodiments receive an RCO request (e.g., by the RCO server) indicating at least one of the set of route segments or the location pair. For example, the RCO request can be received via a portal, like the one illustrated in FIG. 2. At stage 420, embodiments generate an RCO link (e.g., by the RCO server) by retrieving the route connectivity optimization in response to the RCO request. The RCO link provides remote access, by a requesting consumer device, to the route-connectivity optimization. In some embodiments, the RCO link is uniquely associated with a particular stored route connectivity optimization and/or with a particular user, etc. In other embodiments, the RCO link is generally associated with a location pair (e.g., specific origin and destination addresses, general origin and destination regions, etc.), and generating the RCO link involves determine which route connectivity optimization(s) may be relevant for association with the requested RCO link. At stage 424, embodiments transmit the RCO link (e.g., by the RCO server) to the requesting consumer device. As described herein, the transmitting can include any suitable type of transmission to provide a receiving user with desired access to the route connectivity optimization via the RCO link.

Figure 5:
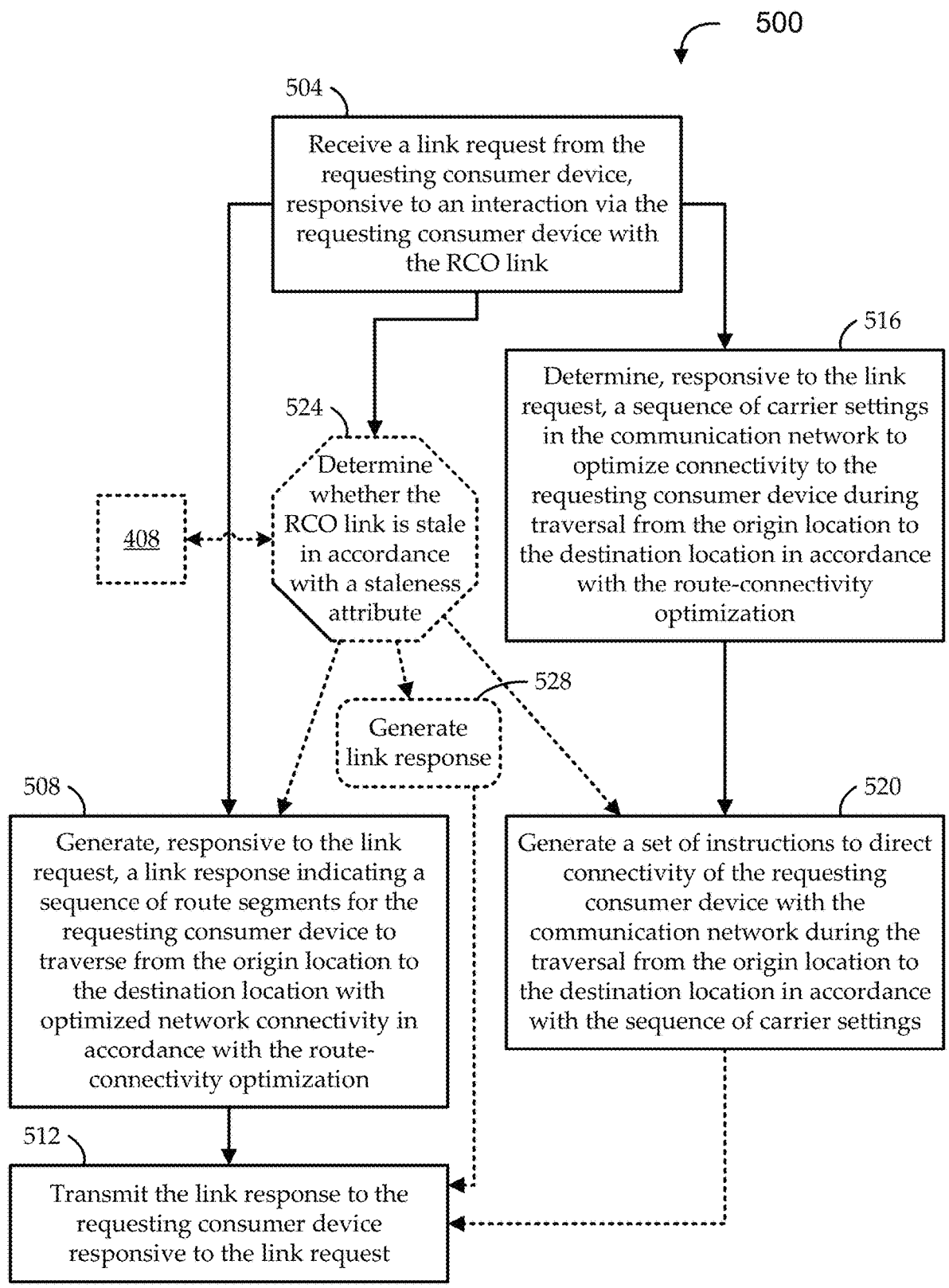
FIG. 5 shows another flow diagram of an illustrative method for route connectivity optimization (RCO) mapping in a communication network, according to various embodiments.

FIG. 5 shows another flow diagram of an illustrative method 500 for route connectivity optimization (RCO) mapping in a communication network, according to various embodiments. Embodiments of the method 500 can be a continuation of the method 400 of FIG. 4. For example, the method 500 of FIG. 5 can begin subsequent to one or more iterations of the method of 400 of FIG. 4. Embodiments begin at stage 504 by receiving a link request from a requesting consumer device responsive to an interaction via the requesting consumer device with an RCO link. For example, the requesting consumer device requests and receives the RCO link according to the method 400 of FIG. 4. Subsequently, a user of the requesting consumer device interacts with the RCO link (e.g., clicks on the link in an email), thereby issuing the link request received, for example by the RCO server, at stage 504.

At stage 508, embodiments generate (e.g., by the RCO server) a link response responsive to the link request. The link response can indicate a sequence of route segments for the requesting consumer device to traverse from the origin location to the destination location with optimized network connectivity in accordance with the route-connectivity optimization. As described herein, the sequence of route segments can be optimized with a preference for connectivity, with a preference for travel time, etc. In some implementations, the sequence of route segments directly corresponds to the requested transport route 160. For example, the transport route 160 is associated with a particular sequence of route segments. In other implementations, the transport route 160 associated with the RCO link indicates a location pair, and the sequence of route segments is dynamically generated as an optimized solution between the origin and destination locations.

The preceding embodiments are directed to providing route connectivity optimizations as an optimized set of route segments. Additionally or alternatively, embodiments can provide route connectivity optimizations as an optimized set of carrier settings. For example, for a given set of route segments, there may be a certain order of handoffs over a particular subset and/or sequence of carriers that provides optimized connectivity across that sequence of route segments. In some embodiments, at stage 516, the method 500 can determine (e.g., by the RCO server), responsive to the link request received at stage 504, a sequence of carrier settings in the communication network to optimize connectivity to the requesting consumer device during traversal from the origin location to the destination location in accordance with the route-connectivity optimization. Some such embodiments, at stage 520, can generate a set of instructions to direct connectivity of the requesting consumer device with the communication network during the traversal from the origin location to the destination location in accordance with the sequence of carrier settings. In some implementations, some or all of the instructions are communicated to infrastructure of the mobile network(s) 145 to direct handoffs, and/or other micro- or macro-level network functions (e.g., to assist with load balancing, modulation and coding, etc.). In other implementations, some or all of the instructions are communicated to the mobile device 150 to direct handoffs, and/or other functions (e.g., power settings, carrier settings, etc.).

At stage 512, embodiments can transmit the link response to the requesting consumer device responsive to the link request. In some implementations, the link response is transmitted directly from the RCO server to the requesting consumer device. The link response can be transmitted in any suitable manner and with any suitable information. In some implementations, the link response includes a set of travel instructions (e.g., driving directions). In other implementations, the link response includes a map with route guidance information. In other implementations, the link response includes connectivity optimization information, such as connectivity quality in different locations. For example, the link response can include text and/or graphical indications of connectivity in particular portions of a transport route 160 (e.g., color-coded route segments across a map, including route segments that may or may not be part of any particular selection of transport route 160). In other implementations, the link response includes computer-readable instructions. In one such implementation, the computer-readable instructions direct a route guidance system (e.g., a GPS device, a smartphone route guidance application, etc.) to provide route guidance based on the route connectivity optimization. In another such implementation, the computer-readable instructions direct an autonomous vehicle to traverse the transport route 160 in accordance with the route connectivity optimization.

In some embodiments, prior to generating and/or transmitting the link response, the method 500 can perform staleness-related functions. At stage 524, embodiments can determine whether the RCO link associated with the link request is stale according to a staleness attribute. The staleness attribute can indicate that the link is stale (e.g., the RCO link was generated to be valid only for a limited time), that route connectivity optimizations associated with the RCO link is stale (e.g., an associated route connectivity optimization was computed more than a threshold time in the past, new relevant route segment connectivity data has been received since the last computation of the associated route connectivity optimization, etc.), etc. If the determination is that the RCO link is not stale, the method 500 can proceed either with stage 508 or 520. If the determination at stage 524 is that the RCO link is stale, the method 500 can proceed in various ways. In some such embodiments, a link response is generated at stage 528 to indicate such (e.g., the link response states that the selected link is stale). For example, the link response can also prompt the receiving user as to whether a new RCO link is desired. In other such embodiments, a new route connectivity optimization is automatically computed and associated with the RCO link. For example, whenever an RCO link is selected, a link response is generated to include one or more fresh route connectivity optimizations. The method 500 can proceed with stage 508 or 520. In some such cases, the generated link response can still provide an indication that the selected link was stale and/or has been updated.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for route connectivity optimization mapping in a communication network servicing a plurality of consumer devices, the system comprising:
   a route segment connectivity data store to store a route-connectivity optimization in association with a set of route segments and a staleness attribute, the route-connectivity optimization computed for the set of route segments as a function of individual route segment connectivity data experienced by one or more initiating consumer devices during traversal through the communication network via the set of route segments,
   wherein the individual route segment connectivity data indicates, for each route segment, a carrier of the communication network that serviced the one or more initiating consumer devices during traversal via the route segment and a quality of service provided to the one or more initiating consumer devices by the carrier in the route segment; and
   a request processor to:
     receive an RCO request from a requesting consumer device indicating the set of route segments;
     direct a link processor to generate an RCO link in response to the RCO request by associating the RCO link with access to the route-connectivity optimization in the route segment connectivity data store;
     transmit the RCO link to the requesting consumer device responsive to the RCO request, such that an interaction via the requesting consumer device with the RCO link provides the requesting consumer device with remote access to the route-connectivity optimization;
     receive a link request from the requesting consumer device responsive to the interaction via the requesting consumer device with the RCO link; and
     transmit a link response to the requesting consumer device responsive to the link request, the link response generated based on the route-connectivity optimization and indicating whether the RCO link is stale based on the staleness attribute.

2. The system of claim 1, wherein:
   the route-connectivity optimization is a particular route-connectivity optimization of a plurality of route-connectivity optimizations, each stored in the route segment connectivity data store in association with a respective set of route segments, each computed for the respective set of route segments as a function of respective individual route segment connectivity data experienced by a respective one or more initiating consumer devices during traversal through the communication network via the respective set of route segments;
   the RCO request indicates a requested set of route segments;
   the request processor is to direct the link processor to generate the RCO link in response to the RCO request further by:
   identifying the particular route-connectivity optimization of the plurality of route-connectivity optimizations as being stored in the route segment connectivity data store in association with the requested set of route segments, such that the RCO link provides remote access, by the requesting consumer device, to the particular route-connectivity optimization.

3. The system of claim 1, wherein:
   the RCO request indicates the set of route segments by indicating a location pair comprising an origin location and a destination location; and
   the request processor is further to derive the set of route segments from the location pair.

4. The system of claim 1, wherein:
   the set of route segments is a subset of a plurality of route segments of a mapping region serviced by the communication network; and
   the route-connectivity optimization is computed for the set of route segments by aggregating the individual route segment connectivity data with previously stored route segment connectivity data for at least a portion of the plurality of route segments.

5. The system of claim 1, wherein the link response is generated based on the route-connectivity optimization to indicate a sequence of route segments for the requesting consumer device to traverse from an origin location to a destination location with optimized network connectivity in accordance with the route-connectivity optimization.

6. The system of claim 5, wherein:
the route-connectivity optimization is computed for the set of route segments by aggregating the individual route segment connectivity data with previously stored route segment connectivity data across at least a portion of a plurality of route segments of a mapping region; and
the sequence of route segments is different from the set of route segments.

7. The system of claim 1, wherein the link response is generated based on the route-connectivity optimization by:
determining, responsive to the link request, a sequence of carrier settings in the communication network to optimize connectivity to the requesting consumer device during traversal from an origin location to a destination location in accordance with the route-connectivity optimization; and
generating a set of instructions to direct connectivity of the requesting consumer device with the communication network during the traversal from the origin location to the destination location in accordance with the sequence of carrier settings.

8. The system of claim 1, wherein the link response is generated to indicate whether the RCO link is stale by:
determining whether the RCO link is stale in accordance with the staleness attribute;
in accordance with determining that the RCO link is not stale, generating the link response to indicate at least one of a sequence of route segments or a sequence of carrier settings to optimize connectivity to the requesting consumer device during traversal from an origin location to a destination location in accordance with the route-connectivity optimization; and
in accordance with determining that the RCO link is stale, generating the link response to indicate expiry of the link.

9. The system of claim 1, wherein in accordance with determining that the RCO link is stale, the link response is further generated to comprise a replacement RCO link, the replacement RCO link generated by re-computing the route-connectivity optimization for the set of route segments as a function of updated route segment connectivity data.

10. A method for route connectivity optimization (RCO) mapping in a communication network servicing a plurality of consumer devices, the method comprising:
receiving an RCO request from a requesting consumer device indicating a set of route segments;
generating an RCO link in response to the RCO request by associating the RCO link with access to a route-connectivity optimization stored in a route segment connectivity data store in association with the set of route segments and a staleness attribute,
wherein the route-connectivity optimization is computed for the set of route segments as a function of individual route segment connectivity data experienced by one or more initiating consumer devices during traversal through the communication network via the set of route segments, and
wherein the individual route segment connectivity data indicates, for each route segment, a carrier of the communication network that serviced the one or more initiating consumer devices during traversal via the route segment and a quality of service provided to the one or more initiating consumer devices by the carrier in the route segment;

transmitting the RCO link to the requesting consumer device responsive to the RCO request, such that an interaction via the requesting consumer device with the RCO link provides the requesting consumer device with remote access to the route-connectivity optimization;
receiving a link request from the requesting consumer device responsive to the interaction via the requesting consumer device with the RCO link; and
transmitting a link response to the requesting consumer device responsive to the link request, the link response generated based on the route-connectivity optimization including determining whether the RCO link is stale based on the staleness attribute associated with the route-connectivity optimization.

11. The method of claim 10, wherein:
the route-connectivity optimization is a particular route-connectivity optimization of a plurality of route-connectivity optimizations, each stored in the route segment connectivity data store in association with a respective set of route segments, each computed for the respective set of route segments as a function of respective individual route segment connectivity data experienced by a respective one or more initiating consumer devices during traversal through the communication network via the respective set of route segments;
the RCO request indicates a requested set of route segments; and
generating the RCO link in response to the RCO request comprises identifying the particular route-connectivity optimization of the plurality of route-connectivity optimizations as being stored in the route segment connectivity data store in association with the requested set of route segments, such that the RCO link provides remote access, by the requesting consumer device, to the particular route-connectivity optimization.

12. The method of claim 10, wherein:
the RCO request indicates the set of route segments by indicating a location pair comprising an origin location and a destination location; and
generating the RCO link comprises deriving the set of route segments from the location pair.

13. The method of claim 10, wherein:
the set of route segments is a subset of a plurality of route segments of a mapping region serviced by the communication network; and
the route-connectivity optimization is computed for the set of route segments by aggregating the individual route segment connectivity data with previously stored route segment connectivity data for at least a portion of the plurality of route segments.

14. The method of claim 10, wherein the link response is generated based on the route-connectivity optimization to indicate a sequence of route segments for the requesting consumer device to traverse from an origin location to a destination location with optimized network connectivity in accordance with the route-connectivity optimization.

15. The method of claim 10, wherein the link response is generated based on the route-connectivity optimization by:
determining, responsive to the link request, a sequence of carrier settings in the communication network to optimize connectivity to the requesting consumer device during traversal from an origin location to a destination location in accordance with the route-connectivity optimization; and generating a set of instructions to direct connectivity of the requesting consumer device with the communication network during the traversal from the origin location to the destination location in accordance with the sequence of carrier settings.

16. The method of claim 10, wherein the link response is generated to indicate whether the RCO link is stale by:

generating, responsive to determining that the RCO link is not stale, the link response to indicate at least one of a sequence of route segments or a sequence of carrier settings to optimize connectivity to the requesting consumer device during traversal from an origin location to a destination location in accordance with the route-connectivity optimization; and generating, responsive to determining that the RCO link is stale, the link response to comprise a replacement RCO link by re-computing the route-connectivity optimization for the set of route segments as a function of updated route segment connectivity data.

* * * * *